United States Patent
Mongillo et al.

(10) Patent No.: US 10,408,453 B2
(45) Date of Patent: Sep. 10, 2019

(54) DILUTION HOLES FOR GAS TURBINE ENGINES

(71) Applicant: United Technologies Corporation, Farmington, CT (US)

(72) Inventors: Dominic Mongillo, West Hartford, CT (US); Christopher Whitfield, Manchester, CT (US); Tracy Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 287 days.

(21) Appl. No.: 15/654,324

(22) Filed: Jul. 19, 2017

(65) Prior Publication Data

US 2019/0024894 A1 Jan. 24, 2019

(51) Int. Cl.
*F23R 3/04* (2006.01)
*F23R 3/06* (2006.01)
(Continued)

(52) U.S. Cl.
CPC ............... *F23R 3/04* (2013.01); *F02C 3/04* (2013.01); *F02C 7/18* (2013.01); *F23R 3/002* (2013.01);
(Continued)

(58) Field of Classification Search
CPC ...................................... F23R 3/04; F23R 3/06
See application file for complete search history.

(56) References Cited

U.S. PATENT DOCUMENTS

| 4,700,544 A | 10/1987 | Fucci | |
|---|---|---|---|
| 4,875,339 A * | 10/1989 | Rasmussen | F23R 3/06 60/757 |

(Continued)

FOREIGN PATENT DOCUMENTS

| EP | 0187731 | 7/1986 |
|---|---|---|
| EP | 1351022 | 10/2003 |

(Continued)

OTHER PUBLICATIONS

Dominic Mongillo, Jr. et al., U.S. Appl. No. 15/725,019, filed Oct. 4, 2017 and entitled Dilution Holes With Ridge Feature for Gas Turbine Engines.

(Continued)

*Primary Examiner* — Todd E Manahan
*Assistant Examiner* — Todd N Jordan
(74) *Attorney, Agent, or Firm* — Snell & Wilmer, L.L.P.

(57) ABSTRACT

A grommet may define a dilution hole in a combustor panel. The grommet may comprise a set of upstream features such as, for example, a first inlet leading into a first plurality of passages with the first plurality of passages each having a first outlet directed towards an inner diameter of the grommet. A set of perimeter features may include a second inlet leading into a convective cooling passage having a plurality of internal cooling features. The convective cooling passage may further lead into a second plurality of passages each having a second outlet extending about the inner diameter of the grommet in a circumferential direction A set of downstream features may include a third inlet leading to a third plurality of passages each having a third outlet directed towards an outer diameter of the grommet.

14 Claims, 10 Drawing Sheets

(51) Int. Cl.
  *F02C 3/04* (2006.01)
  *F02C 7/18* (2006.01)
  *F23R 3/00* (2006.01)

(52) U.S. Cl.
  CPC ............ *F23R 3/06* (2013.01); *F05D 2220/32* (2013.01); *F05D 2230/50* (2013.01); *F05D 2240/35* (2013.01); *F05D 2250/71* (2013.01); *F05D 2260/202* (2013.01); *F05D 2260/2214* (2013.01); *F23R 2900/00018* (2013.01); *F23R 2900/03042* (2013.01); *F23R 2900/03043* (2013.01)

(56) References Cited

U.S. PATENT DOCUMENTS

| | | | |
|---|---|---|---|
| 10,145,559 B2* | 12/2018 | Gonyou | F23R 3/002 |
| 10,317,079 B2* | 6/2019 | Kostka, Jr. | F23R 3/06 |
| 2012/0297778 A1 | 11/2012 | Rudrapatna et al. | |
| 2013/0298564 A1* | 11/2013 | Agarwal | F23R 3/06 60/772 |
| 2014/0083112 A1 | 3/2014 | Jause et al. | |
| 2016/0025006 A1 | 1/2016 | Propheter-Hinckley et al. | |
| 2016/0025342 A1 | 1/2016 | Erbas-Sen et al. | |
| 2016/0131363 A1 | 5/2016 | Cunha et al. | |
| 2016/0209035 A1* | 7/2016 | Cramer | F23R 3/02 |
| 2016/0238253 A1 | 8/2016 | Moura et al. | |
| 2017/0059162 A1* | 3/2017 | Papple | F23R 3/16 |
| 2017/0108220 A1* | 4/2017 | Kostka, Jr. | F23R 3/06 |
| 2019/0101289 A1* | 4/2019 | Mongillo, Jr. | F23R 3/04 |

FOREIGN PATENT DOCUMENTS

| | | |
|---|---|---|
| EP | 2963346 | 1/2016 |
| EP | 3040615 | 7/2016 |
| EP | 3182010 | 6/2017 |
| GB | 2353589 | 2/2001 |
| WO | 2014112992 | 7/2014 |
| WO | 2015147929 | 10/2015 |
| WO | 2016114853 | 7/2016 |

OTHER PUBLICATIONS

European Patent Office, European Search Report dated Oct. 29, 2018 in Application No. 18181617.04.

European Patent Office, European Search Report dated Nov. 21, 2018 in Application No. 18198175.4.

* cited by examiner

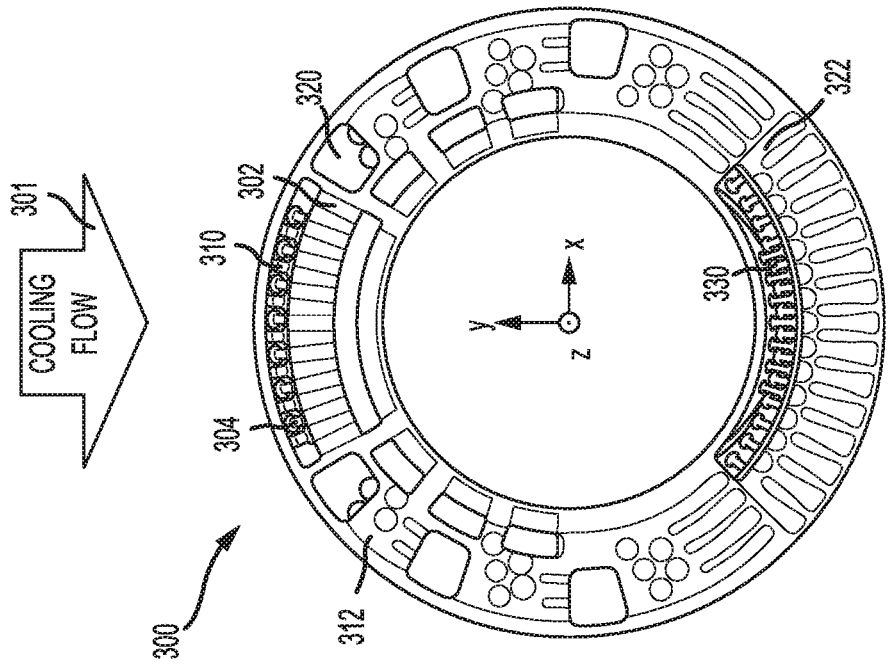
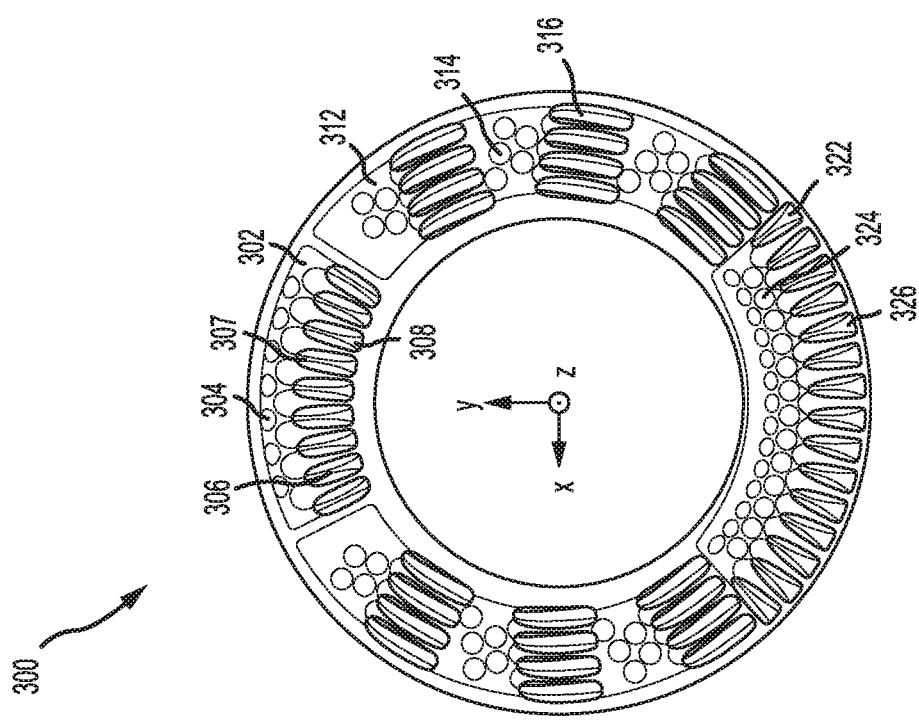

DILUTION HOLES FOR GAS TURBINE ENGINES

FIELD

The disclosure relates generally to diffusion holes in gas turbine engines.

BACKGROUND

Combustor temperatures in gas turbine engines can reach extreme heights. The air temperature in a combustor often exceeds the melting point of the combustor liner. Combustors often have "dilution holes" in the liner. Dilution holes allow combustors to operate at conditions that minimize emissions generated during the combustion process. In addition, dilution holes promote mixing within the combustion chamber, which serves to condition the flow entering the turbine. Combustion dilution holes are often disposed at locations that are difficult to cool. The dilution holes may also have separations within the dilution holes that tend to entrain hot gas produce localized hot spots. The hot spots can damage the dilution holes themselves, as well as the surrounding combustor liner.

Dilution hole and distress may alter the intended shape of the holes, which may impact the level of emissions generated by the combustor. Such distress may also impact the mixing of flow before the flow enters the high pressure turbine portion of the engine. Inadequate mixing of flow entering the turbine may cause distress on turbine hardware. Additionally, combustor liner and dilution hole distress may negatively impact overall engine efficiency.

Dilution holes are typically not designed to actively cool the surrounding combustor liner. Cooling features surrounding the dilution hole may be used to actively cool the area immediately surrounding the dilution hole. Conventional cooling techniques used around dilution holes rely on drilling discrete cooling holes, which may not be able to provide adequate cooling to the combustor liner. Novel ways to cool the area immediately surrounding dilution holes may extend the life of combustor and turbine hardware, as well as contribute positively to combustion emissions and overall engine performance.

SUMMARY

A grommet defining a dilution hole is provided in the present disclosure. The grommet may comprise a set of upstream features such as, for example, a first inlet leading into a first plurality of passages with the first plurality of passages each having a first outlet directed towards an inner diameter of the grommet. A set of perimeter features may include a second inlet leading into a convective cooling passage having a plurality of internal cooling features. The convective cooling passage may further lead into a second plurality of passages extending about the inner diameter of the grommet in a circumferential direction. A set of downstream features may include a third inlet leading to a third plurality of passages each having a second outlet directed towards an outer diameter of the grommet.

In various embodiments, the second outlets of the third plurality of passages may be oriented in convergent directions. A bell-mouth inlet may be disposed about the inner diameter of the grommet, wherein the bell-mouth inlet comprises at least one of a radial curve or multi-radial curve. The bell-mouth inlet may also comprise one or more of the first inlet, the second inlet, and the third inlet. The convective cooling passage may also comprise a segment devoid of pedestals between the second inlet and the second plurality of passages.

A combustor liner is also provided. The combustor liner includes an array of cooling holes and a plurality of grommets formed integrally with the combustor liner. The grommets define the area around the perimeter of the dilution holes. Each grommet may include a first inlet formed on the cold side of the combustor liner and leading into a first plurality of passages. Each of the first plurality of passages may have an outlet formed on the hot side of the combustor liner and directed towards an inner diameter of the grommet. A second inlet may be formed on the cold side of the combustor liner and lead into a convective cooling passage. The convective cooling passage may have a plurality of internal cooling features. The convective cooling passage may also lead into a second plurality of passages that extend about the inner diameter of the grommet in a circumferential direction and open to the hot side of the combustor liner. A third inlet may be formed on the cold side of the combustor liner. The third inlet may lead to a third plurality of passages with each of the passages having a second outlet. The second outlets may be formed on the hot side of the combustor liner and directed towards an outer diameter of the grommet.

In various embodiments, the second outlets of the third plurality of passages may be oriented in convergent directions. A bell-mouth inlet may be disposed about the inner diameter of the grommet and may comprise radial curve or multiple radial curves. The bell-mouth inlet may also include one or more of the first inlet, the second inlet, and the third inlet. The convective cooling passage may comprise a segment devoid of pedestals between the second inlet and the second plurality of passages.

A gas turbine engine is further provided. The gas turbine engine may include a compressor section configured to compress a gas, a combustor section aft of the compressor section and configured to combust the gas, and a turbine section aft of the combustor section and configured to extract energy from the combusted gas. The combustor section may include a liner having a plurality of grommets formed integrally with the liner. The grommets may define a plurality of dilution holes. Each grommet may include a first inlet formed on the cold side of the liner and leading into a first plurality of passages. Each of the first plurality of passages may have a first outlet formed on the hot side of the liner and directed towards an inner diameter of the grommet. A second inlet may be formed on the cold side of the liner and may lead into a convective cooling passage having a plurality of pedestals formed in the convective cooling passage. The convective cooling passage may further lead into a second plurality of passages disposed about the inner diameter of the grommet in a circumferential direction. The second plurality of passages may open onto the hot side of the liner. A third inlet may be formed on the cold side of the liner. The third inlet may lead to a third plurality of passages with each passage from the third plurality of passages comprises a second outlet formed on the hot side of the liner. Each of the second outlets of the third plurality of passages is directed towards an outer diameter of the grommet.

In various embodiments, a bell-mouth inlet may be disposed about the inner diameter of the grommet. The bell-mouth inlet may comprise a radial curve and/or multi-radial curve. The bell-mouth inlet may also include one or more of the first inlet, the second inlet, and the third inlet. The convective cooling passage may comprise a segment devoid of pedestals between the second inlet and the second plurality of passages.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 3A illustrates a top view of a hot side of a grommet defining dilution hole with internally defined cooling features, in accordance with various embodiments;

FIG. 3B illustrates a bottom view of cold side of a grommet defining a dilution hole and having internally defined cooling features, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
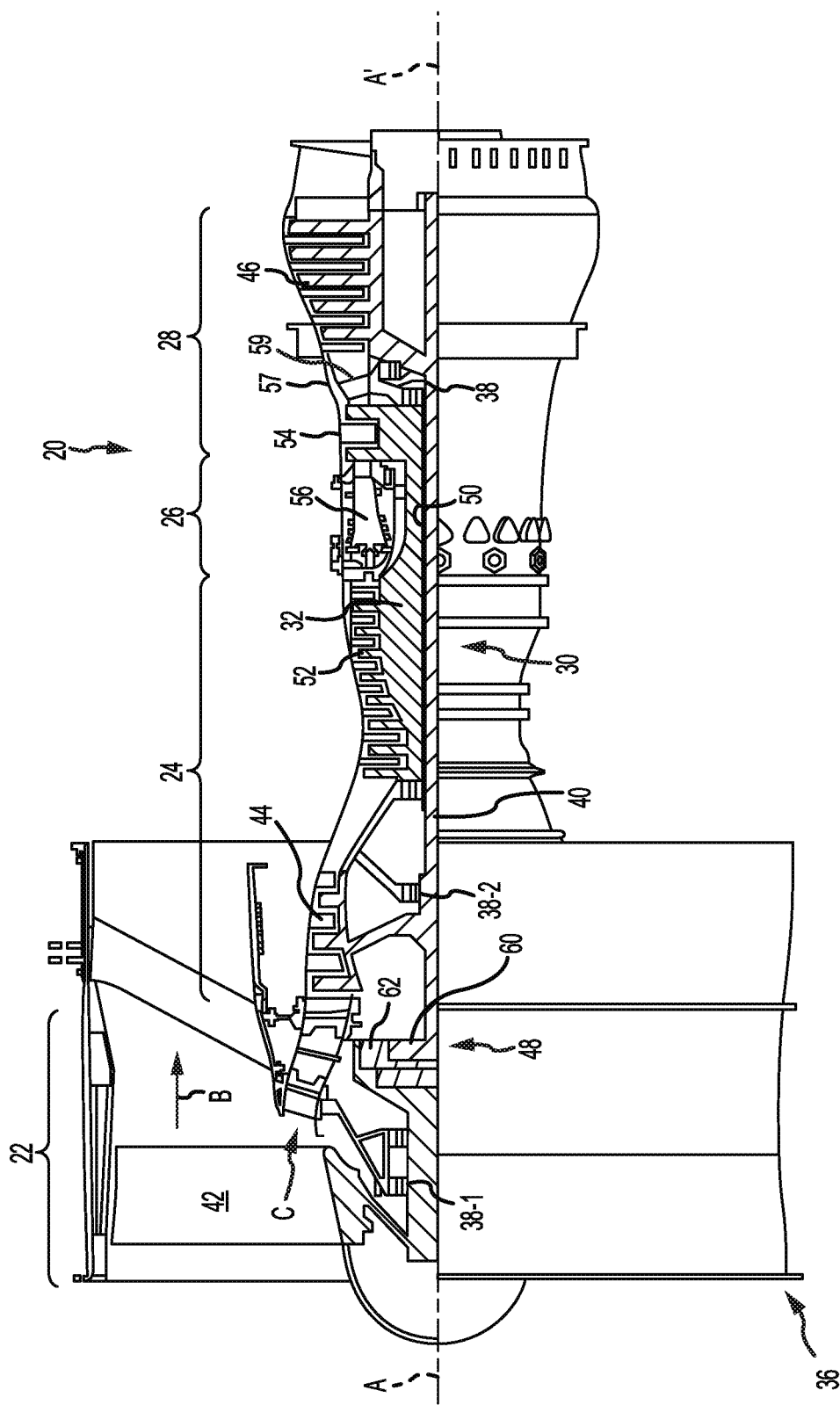
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Figure 2:
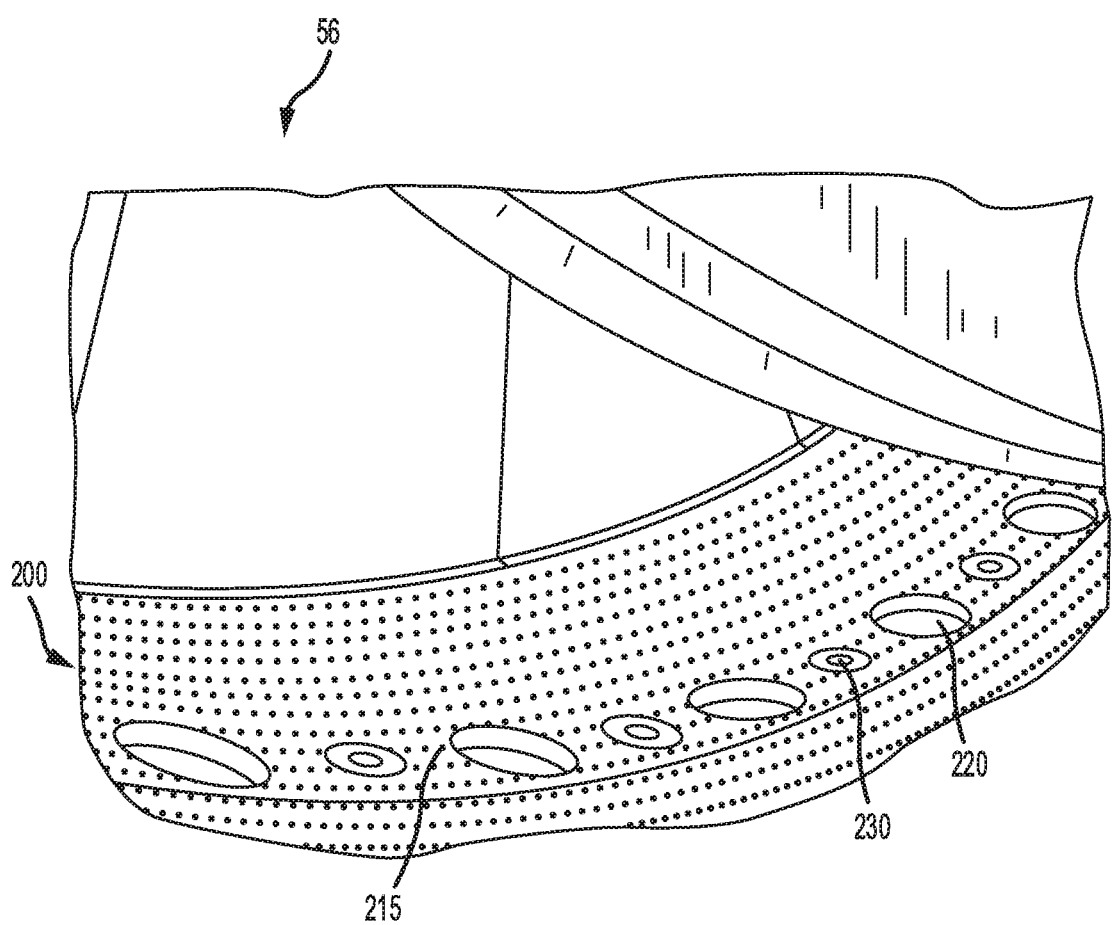
FIG. 2 illustrates a combustor having dilution holes formed through a liner, in accordance with various embodiments.
Figure 3D:
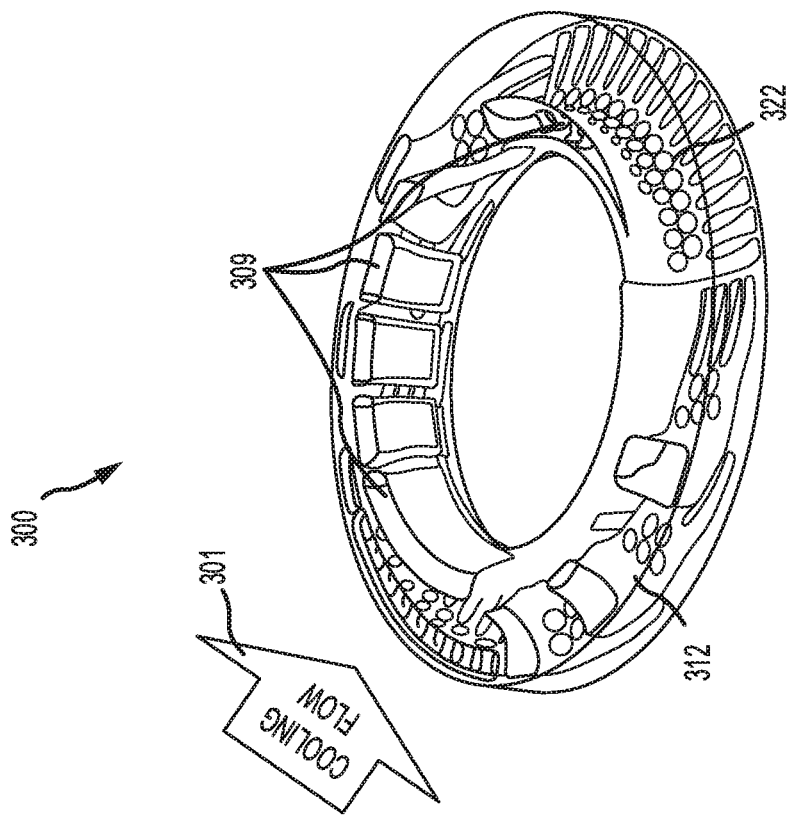
FIG. 3D illustrates a perspective-bottom view of a cold side of a grommet defining a dilution hole and having internally defined cooling features, in accordance with various embodiments.
Figure 3C:
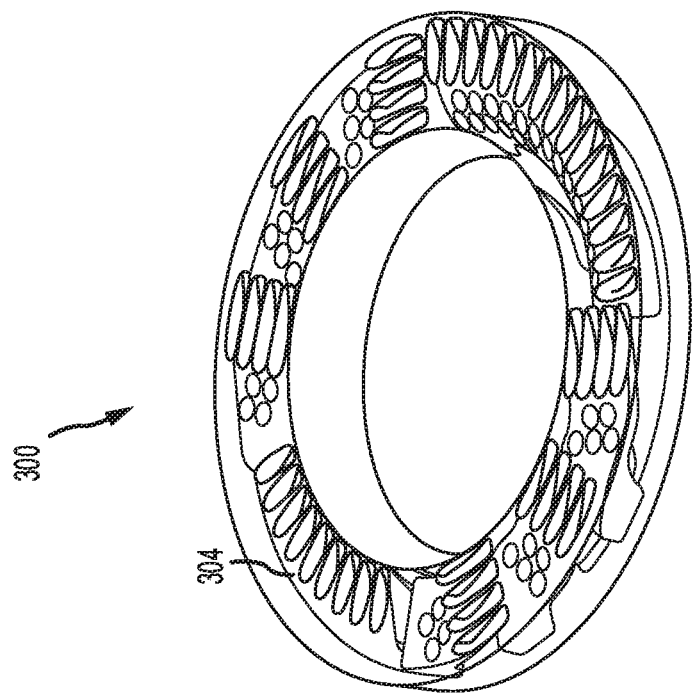
FIG. 3C illustrates a perspective-top view of hot side of a grommet defining a dilution hole and having internally defined cooling features, in accordance with various embodiments.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2 in FIG. 2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sure gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

According to various embodiments and with reference to FIG. 2, the systems and apparatus disclosed herein are configured to reduce the local temperatures in and about dilution holes 220. Dilution holes 220 may be formed integrally with, bonded to, or otherwise disposed in combustor liner 200. Dilution holes 220 are used to introduce additional compressed air into the combustion chamber. This ensures the gas has combusted with in the chamber and dilutes or distributes combusted gases around the combustor prior to entering the turbine. Dilution holes 220 thereby tend to prevent combustion within the turbine and provide sufficient mixing of combustion gases to minimize the temperature of hot streaks within the turbine. Dilution holes 220 or trim holes 230 may be distributed on a surface to optimize combustion and reduce peak combustion temperatures for emissions purposes in zones within the combustor. As used herein dilution holes 220 or trim holes 230 are, in general, apertures in which a flow of air is introduced that becomes part of the combustion process. The air flow through cooling holes 215, dilution holes 220, and/or trim holes 230 may be directed through internal cavities and across internal cooling features prior to exiting dilution hole 220 and/or trim hole 230. High temperatures can be present in the vicinity of the dilution 220 and trim 230 holes. Uncombusted gasses which are introduced to air exiting the dilution 220 and trim 230 holes can also increase the temperatures at those locations. These increased temperatures may increase thermal strain and lead to premature oxidization of the areas surrounding the dilution 220 and trim 230 holes. Dilution holes 220 may have cooling features arranged to provide internal cooling and film cooling. The features may be arranged to limit the thermal distress occurring in the region near dilution holes 220.

Referring now to FIGS. 3A-3D, a grommet 300 having internal cooling features is shown with an inner diameter of grommet 300 defining a dilution hole 220 of FIG. 2, in accordance with various embodiments. Grommet 300 is illustrated in FIGS. 3A-3D with transparent surfaces to show the location and geometry of internal cooling features and passages, while FIGS. 6-13 illustrate a grommet 300 in various cross-sectional views to further show the location and geometry of internal cooling features and passages of grommet 300. Grommets 300 are disposed within, formed integrally with, and/or or coupled to combustor liner 200 of FIG. 2 to define dilution holes 220. Grommet 300 may have an inner diameter of approximately ⅛ inch (3 mm), ¼ inch (6 mm), ½ inch (13 mm), ¾ inch (19 mm), 1 inch (25 mm), for example. The outer diameter of grommet 300 may be defined by the boundaries of the internal cooling features 304, and may have a diameter of approximately ¼ inch (6 mm), ½ inch (13 mm), ¾ inch (19 mm), 1 inch (25 mm), or 1.5 inches (38 mm), for example. Grommet 300 may also have a thickness in the axial direction of the dilution hole 220 that approximates the thickness of combustor liner 200 in FIG. 2, which may be on the order of 100 thousandths of an inch (2.5 mm), 200 thousandths of an inch (5 mm), or 500 thousandths of an inch (1 cm), for example. In various embodiments, grommet 300 may be as thick as is suitable for cooling. For example, the thickness of a grommet described herein may include the thickness of a shell, a void between the liner and shell, and/or the liner. The grommet may also protrude into the cold air chamber from which cooling passages within the dilution hole extract cooling air.

In various embodiments, grommet 300 may include internal cooling features, inlet ports, and exhaust ports to improve thermal properties of an engine component (e.g., liner 200 of FIG. 2). Examples of internal cooling features of grommet 300 include internal convective cooling passages, heat transfer augmentation features, and other cooling features as described below.

In various embodiments, grommet 300 may comprise various sets of cooling features including upstream cooling features 302, perimeter cooling features 312, downstream cooling features 322, and inner diameter cooling features 332. Upstream cooling features 302 may generally be oriented towards the incoming cooling flow. Cooling flow 301 may enter passages 306 of upstream cooling features 302 at inlet 310. Cooling flow 301 entering inlet 310 may pass across internal cooling features 304 formed along the boundaries of passages 306. Internal cooling features 304 may include pedestals, turbulators, trip strips, contoured surfaces, vascular lattice cooling, or other heat transfer augmentation features to increase heat transfer and/or generate turbulent coolant flow across upstream cooling features 302.

In various embodiments, internal cooling features 304 may be aligned with a build direction of an additive manufacturing technique at an angle less than +/−45 degrees, less than +/−35 degrees, or less than +/−25 degrees. Passages 306 may extend in a circumferential direction about inner diameter of grommet 300 and open to outlet holes 308. Outlet holes 308 may eject coolant in a jet, film, or other flow configuration. Although additive manufacturing is disclosed herein as a suitable technique for making grommet 300, other techniques may also be used. Other examples of suitable techniques for making grommet 300 may include casting, additively manufacturing die and/or core, direct metal additive manufacturing, lost wax casting, or other suitable techniques.

In various embodiments, passages 306 may comprise variable length micro-channels 307 which tend to maximize internal convective surface area. Grommet 300 is shown with many passages 306 extending radially and internal cooling features 304 formed internally, and may result in relatively large internal pressure loss in exchange for enhanced cooling capacity, i.e., the enhanced ability to remove heat per unit time. Internal pressure loss, heat transfer augmentation, and cooling heat pickup may be tailored based on local external heat flux and outflow margin requirements by adding, removing, moving, resizing, or otherwise modifying passages 306 and/or internal cooling features 304.

Figure 8:
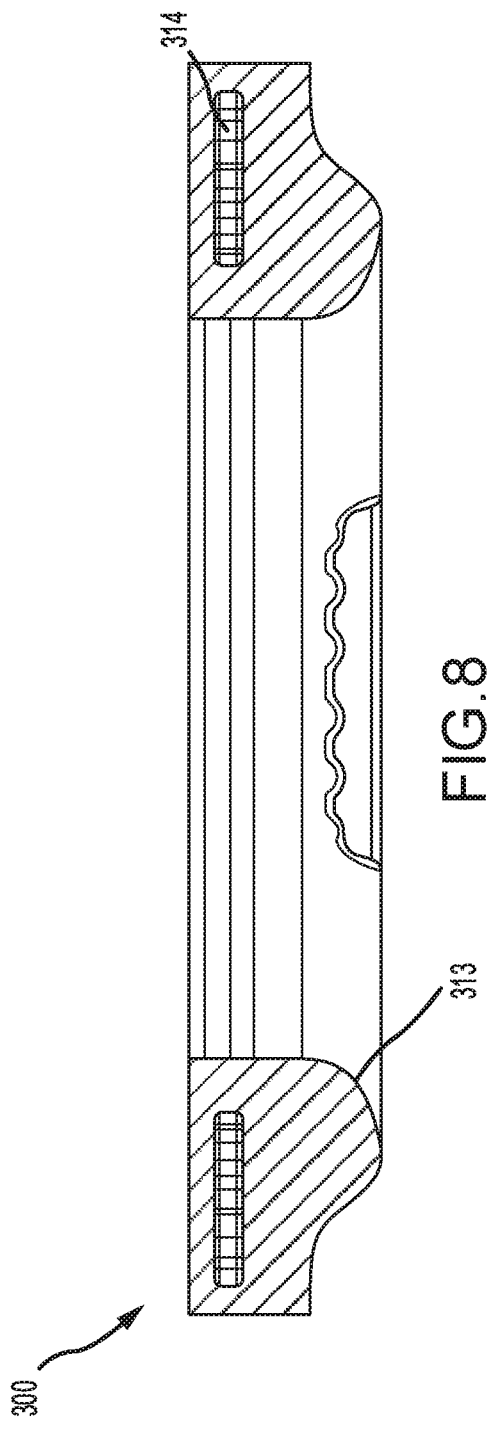
FIG. 8 illustrates a cross-sectional view of a grommet with a circular inner diameter, in accordance with various embodiments.
Figure 10:
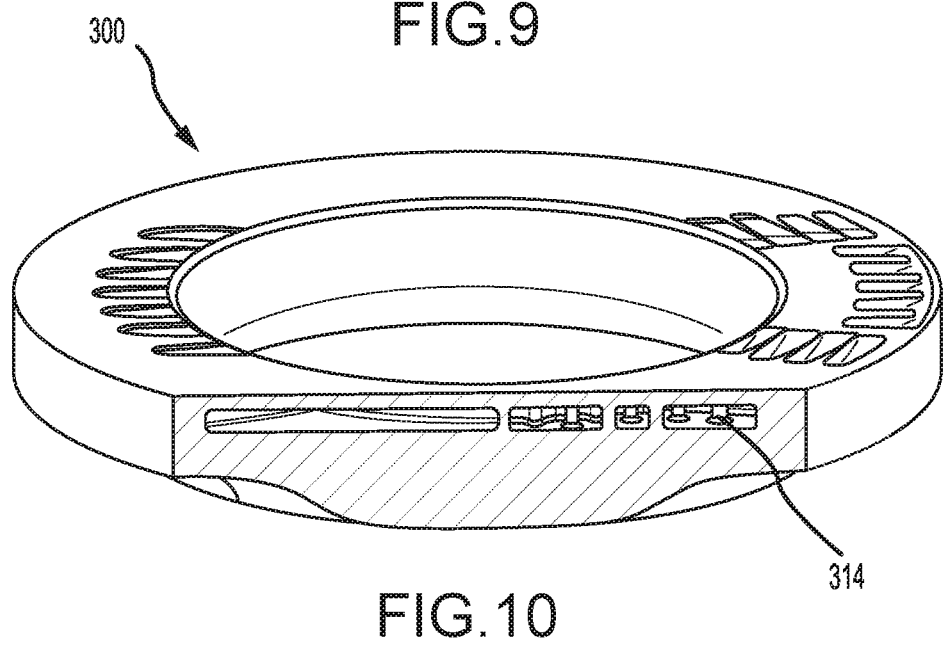
FIG. 10 illustrates a cross-sectional elevation view of a grommet having internal passages and pedestals, in accordance with various embodiments.
Figure 11:
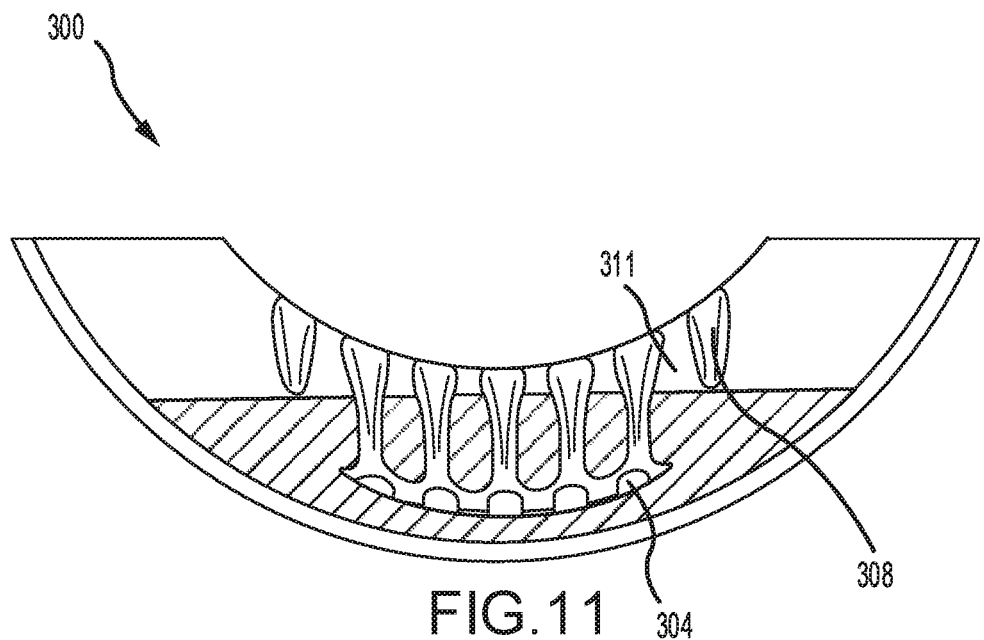
FIG. 11 illustrates a cross-sectional view of an upstream portion of a grommet having teardrop outlets and internal pedestals, in accordance with various embodiments.

In various embodiments, grommet 300 may comprise perimeter cooling features 312 similar to upstream cooling features 302 and located about grommet 300 between upstream cooling features 302 and downstream cooling features 322. Perimeter cooling features 312 may include internal cooling features 314 formed prior to exit passages 316. Internal cooling features 314 may be similar to internal cooling features 304, and passages 316 may be similar to passages 306, with varied lengths, sizes, contours, hydraulic diameters, or other dimensions. Passages 316 may intake the cooling flow 301 at inlet 320. With brief reference to FIG. 8, an example of internal cooling features 314 is shown as viewed from the cross section of a grommet 300 taken across line A of FIG. 6. Internal cooling feature 314 is shown as a pedestal in FIG. 8, though other internal cooling features as described herein may also be formed in grommet 300. FIG. 8 also illustrates rounded bell mouth 313 about inner diameter of grommet 300. Internal cooling feature 314 is also shown as a pedestal in the cross-sectional view from line C of FIG. 6 as shown in FIG. 10.

In various embodiments, downstream cooling features 322 may include internal cooling features 324 formed prior to passages 326. Internal cooling features 324 may also be similar to internal cooling features 304, and passages 326 may also be similar to passages 306, with varied lengths, sizes, contours, hydraulic diameters, or other dimensions. Passages 326 may intake the cooling flow 301 at inlet 330.

Figure 6:
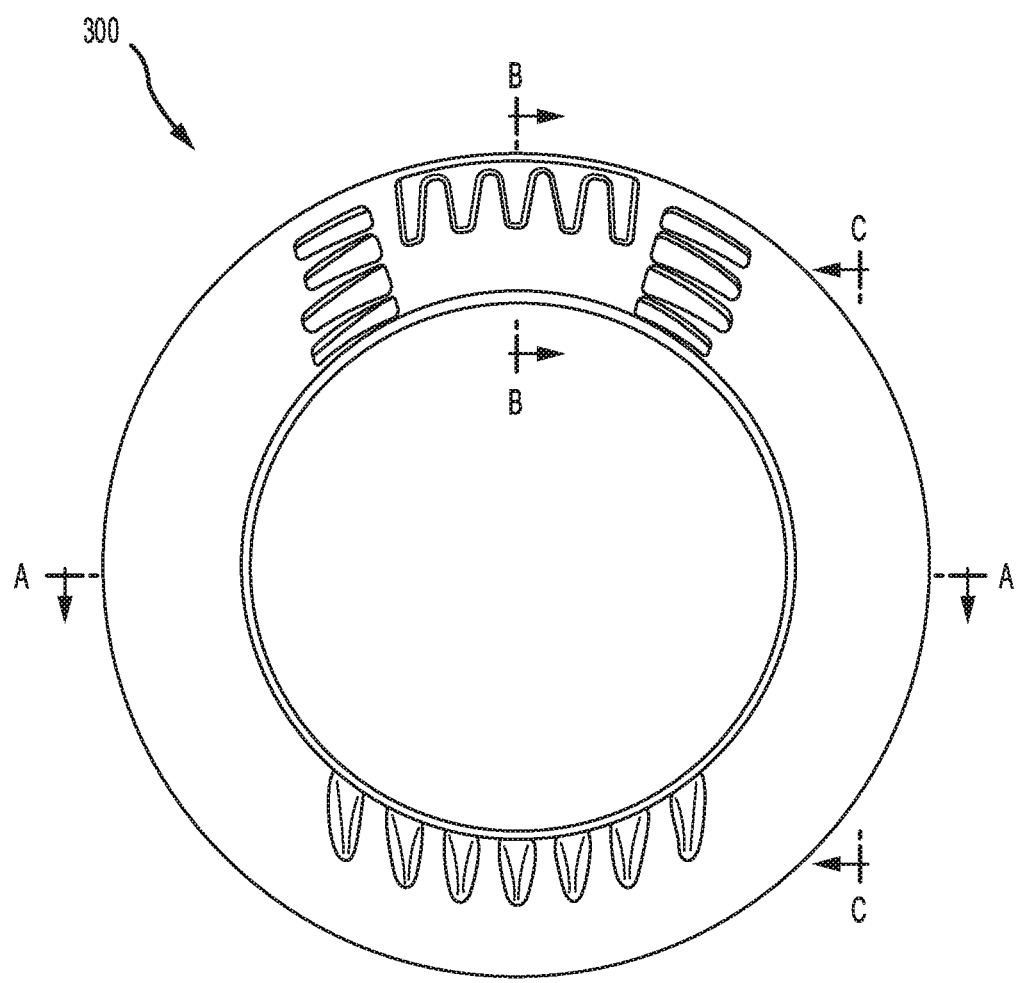
FIG. 6 illustrates a top view of a grommet from the hot side, in accordance with various embodiments.
Figure 9:
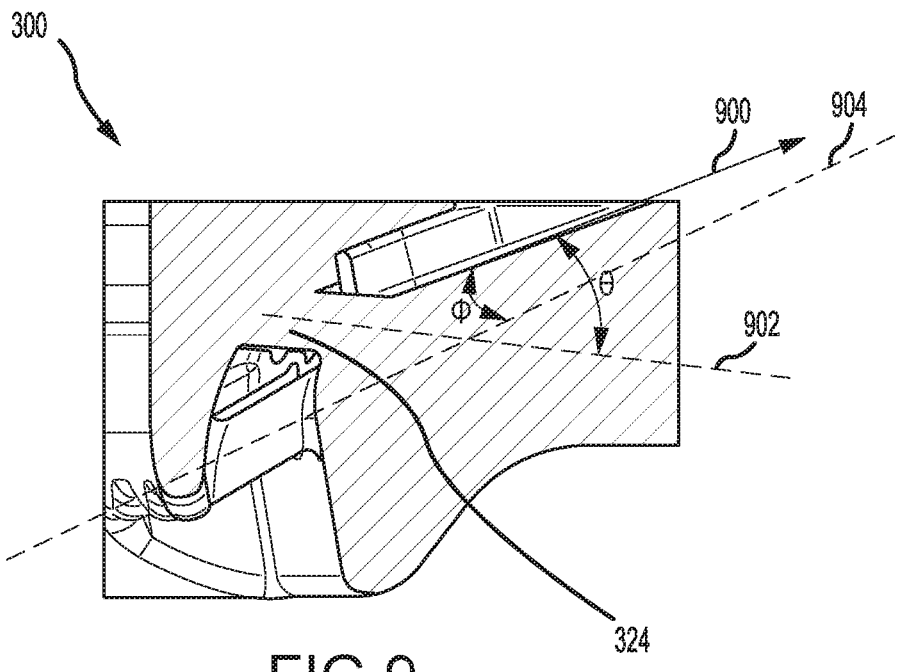
FIG. 9 illustrates a cross-sectional view of a grommet having a pedestal aligned with an additive manufacturing build direction, in accordance with various embodiments.

With brief reference to FIG. 9, an example of internal cooling features 324 (e.g., pedestals) of grommet 300 is shown in cross section as viewed from line B of FIG. 6. The center line 902 of internal cooling feature 324 (e.g., a pedestal) may be oriented at angle θ relative to the build direction 900 of an additive manufacturing process. Angle θ may be less than or equal to 45 degrees, less than or equal to 35 degrees, or less than or equal to 25 degrees, for example. In that regard, internal cooling feature 324 may be aligned with the build direction of the additive manufacturing process. Similarly, a centerline of a row of pedestals 904 may be oriented at an angle φ relative to the build direction 900 of an additive manufacturing process. Angle φ may be less than 20 degrees, less than 15 degrees, less than 10 degrees, or less than 5 degrees, for example.

Figure 7:
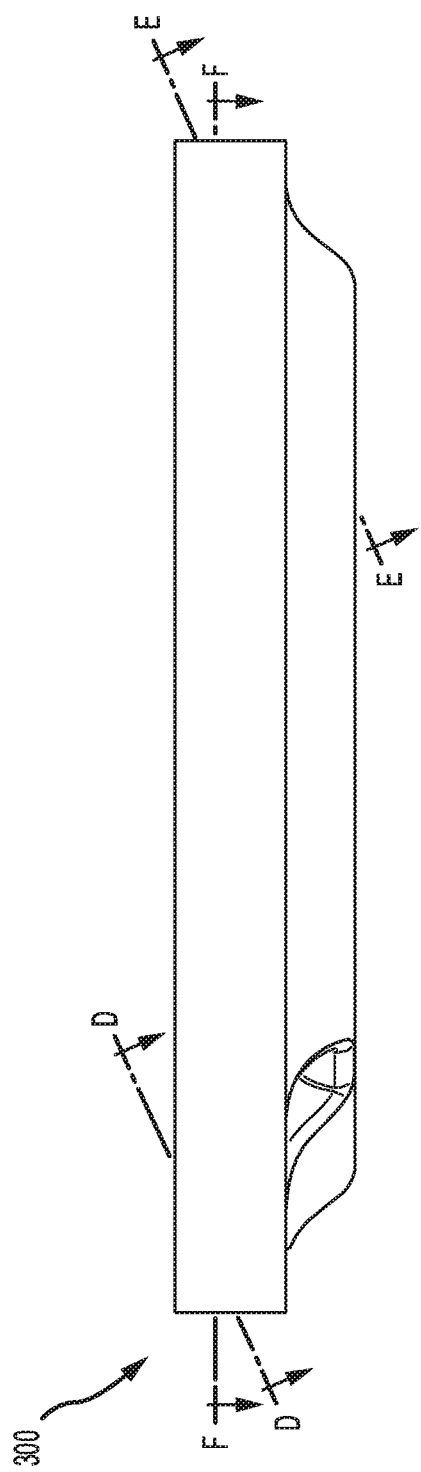
FIG. 7 illustrates an elevation view of a grommet, in accordance with various embodiments.
Figure 12:
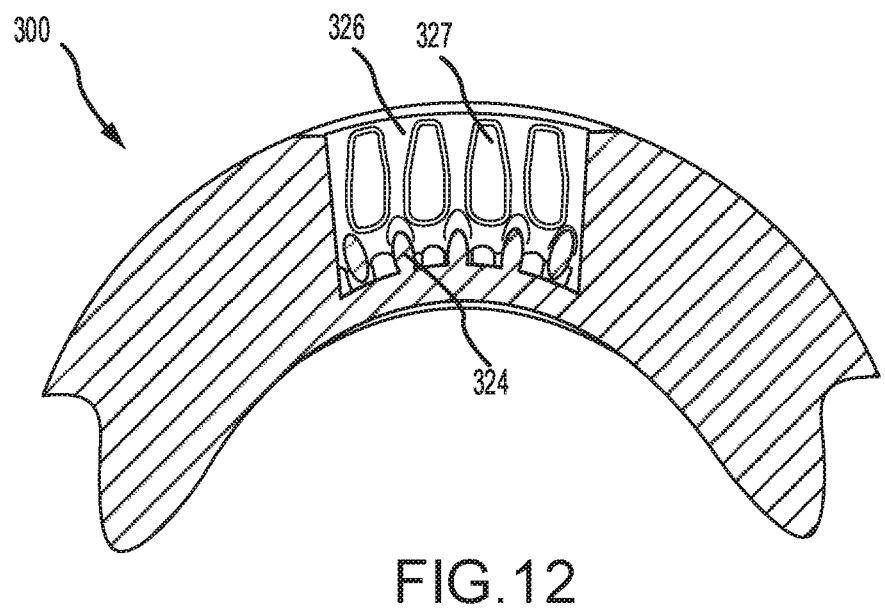
FIG. 12 illustrates a cross-sectional view of a downstream portion of a grommet having teardrop outlets and internal pedestals, in accordance with various embodiments.
Figure 13:
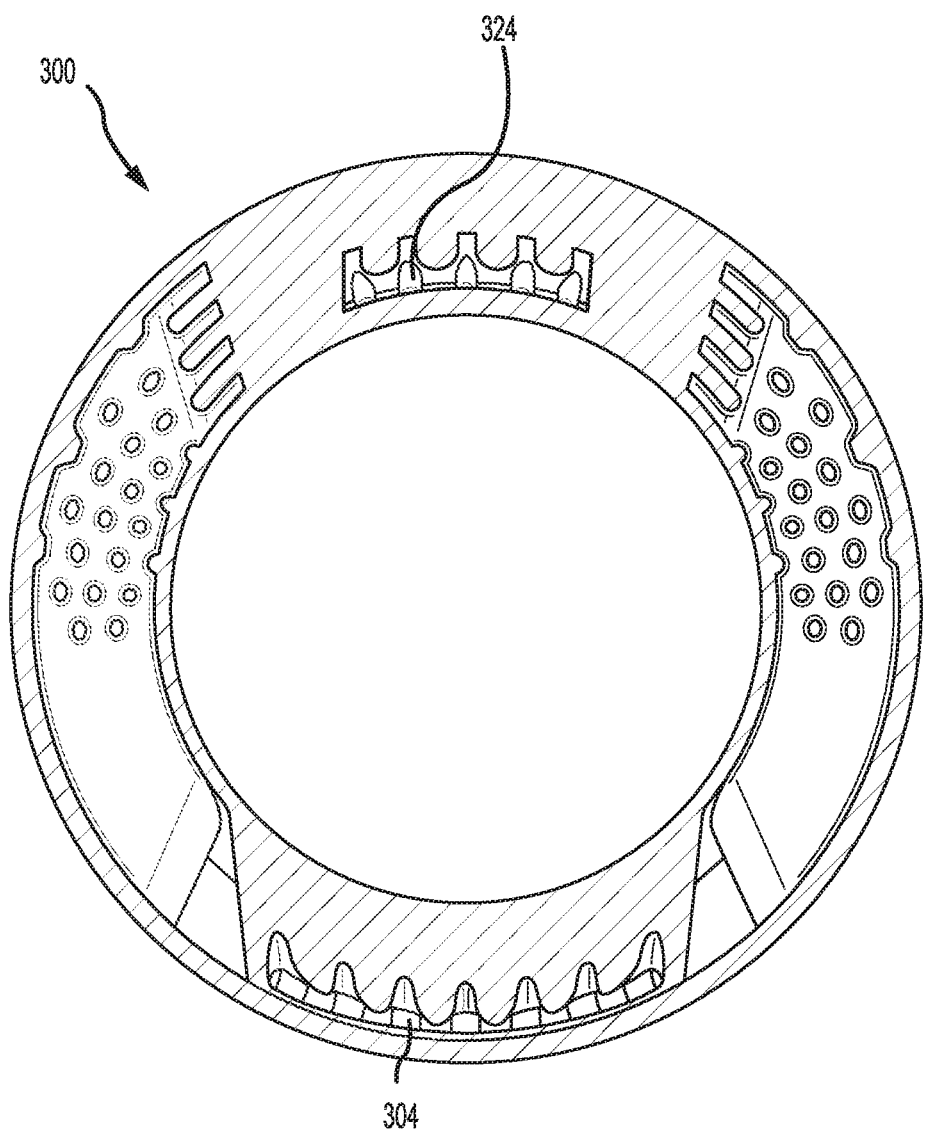
FIG. 13 illustrates a cross sectional view of a grommet having internal cooling features and passages, in accordance with various embodiments.

Referring briefly to FIG. 12, a cross sectional view of grommet 300 is shown as viewed from line E of FIG. 7 with grommet 300 having internal cooling features 324 and passages 326 defined between structural members 327. Structural members 327 may have a teardrop geometry similar to that of structural members 311 with passages 326 disposed between passages 326. FIG. 13 illustrates an example arrangement of internal cooling features as viewed from line F of FIG. 7 including internal cooling features 304, internal cooling features 314, and internal cooling features 324.

In various embodiments, the geometry oxidation in grommet 300 may impact the design intent mass flux and momentum flux ratios which controls jet dilution hole jet spreading, penetration, and mixing. Changes in dilution hole geometry resulting from premature oxidation distress also can significantly influence the amount of local turbulent mixing that occurs in the lean region of the combustor and adversely impact design intent radial and circumferential gas temperature distributions resulting in reduced turbine durability capability and aero dynamic turbine efficiency and performance. Oxidation can also change the effective area of the dilution hole, causing more flow to enter the dilution hole than intended, which actually reduces the pressure drop across the combustor. The grommets of the present disclosure tend to limit oxidation and the negative effects of oxidation.

In various embodiments, cooling flow 301 may come from a high pressure feed source such as a cold-side coolant supply. Cooling flow may thus feed from high pressure diffuser source pressure in order to maximize available pressure drop for cooling. By maximizing available pressure drop available for cooling, pressure loss may be more effectively used to provide higher internal convective heat transfer cooling and increased convective surface area.

In various embodiments, grommet 300 may include a bell-mouth inlet 313 having a curved geometry oriented about the inner diameter of grommet 300. Additionally, internal cooling features 302, 312 and 322 may include bell-mouth inlets 309. Bell-mouth inlet 309 may comprise a plurality of inlets defined in a surface of grommet 300 and extending substantially about the inner diameter of grommet 300. The dilution hole geometry may extend radially outward, flush with the combustor liner. The bell-mouth inlet 313 may have an increased length relative to non-curved inlet geometries. The increased length of the dilution hole may enable geometric design features that reduce entrance loss effects and regions of local flow separation the occur with conventional dilution hole geometry. Bell-mouth inlets 313 and 309 may incorporate a simple and/or compound radii bell-mouth fillet feature around the circumference of the inner diameter of grommet 300. The curved surface of bell-mouth inlet 313 may reduce dilution hole inlet loss characteristics attributed to the sudden contraction and turning of the flow entering the dilution hole. Typical sharped edge dilution hole geometries may produce local wake shedding and flow separation along the leading edge of the inner diameter of the dilution hole. The separated flow region along the inner diameter of the dilution hole may also create a vena contracta, which also lowers the discharge coefficient of dilution hole. The term vena contracta describes the point in a fluid stream where the diameter of the stream is the least, and fluid velocity is at its maximum.

In various embodiments, grommet 300 may utilize hot-side continuous slot film and effusion hole cooling. Outlet holes 308 may comprise discreet effusion holes, discrete teardrops, and/or continuous slot film cooling. With brief reference to FIG. 11, an example of grommet 300 with outlet holes 308 defined between structural member 311 having a teardrop geometry and internal cooling features 304 (e.g., pedestals) is shown as viewed from line D of FIG. 6. Utilization of diffusing teardrops & slot cooling film features maximizes local adiabatic film effectiveness. Slot geometries provide continuous, low-momentum film flow that may mitigate local hot gas entrainment and thus improve downstream film attenuation. Teardrop features facilitate film flow directionality as well as mitigates impact of multi-directional highly 3D swirling flow fields.

Figure 4:
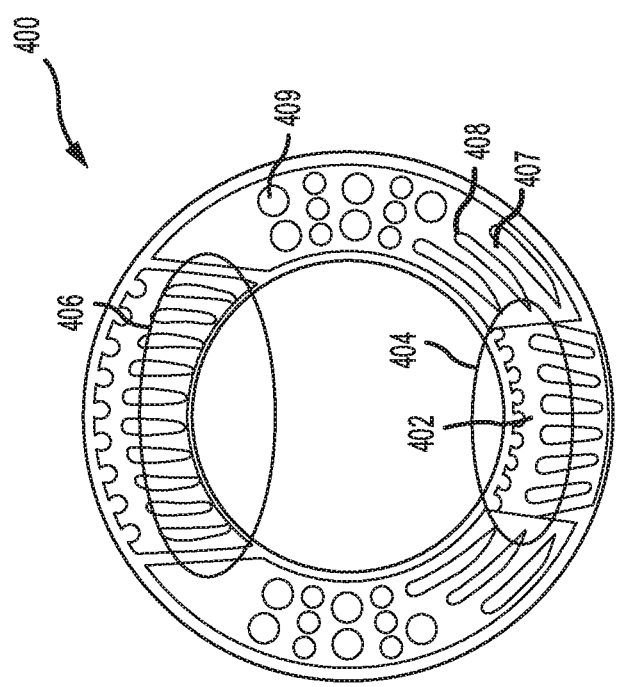
FIG. 4 illustrates a grommet defining a dilution hole and having improved cooling efficiency, in accordance with various embodiments.

Referring now to FIG. 4, grommet 400 is shown, in accordance with various embodiments. Grommet 400 comprise features, geometries, construction, manufacturing techniques, and/or internal components similar to grommet 300 of FIGS. 3A-3D and dilution hole 220 of FIG. 2 but with varied arrangements of internal cooling features to balance cooling performance with the pressure drop across grommet 400. Internal components in grommet 400 may be formed using additive manufacturing techniques with the pin fins 402 in downstream region 404 and/or upstream region 406 substantially aligned with the additive manufacturing build direction. Suitable additive manufacturing techniques may include direct metal laser sintering, selective laser sintering, selective laser melting, electron-beam melting, or electron-beam freeform fabrication. For combustor applications, diffusion holes may be made using a high-temperature capable alloy such as a nickel-based superalloy. In that regard, aligning pin fins 402 with the additive manufacturing build direction may simply involve aligning the filament build direction with the length of the pin fins 402. Other manufacturing techniques may be used either alone or in conjunction with additive manufacturing to generate features of grommet 400 such as investment casting. For example, laser drilling or electric discharge machining may be used for material removal to form cooling features and contours of grommet 400.

In various embodiments, passages 407 of grommet 400 may be joined by radial or multi-radial surface 408 to split the cooling flow between passages 407. Pedestals 409 may be formed in rows of having similar diameters. For example, two pedestals 409 may be aligned along a substantially radial line of grommet 400. Three pedestals having a smaller diameter may be aligned along a second substantially radial line of grommet 400. The pedestals may turbulate and/or slow cooling flow entering passages 407.

Figure 5:
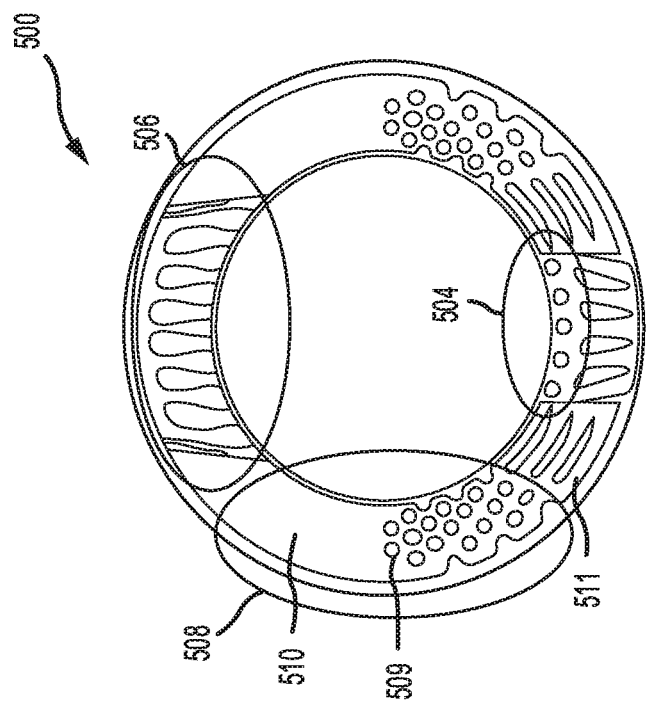
FIG. 5 illustrates a grommet defining a dilution hole and having improved cooling efficiency, in accordance with various embodiments.

Referring now to FIG. 5, grommet 500 is shown, in accordance with various embodiments. Grommet 500 includes features, geometries, construction, and internal components similar to grommet 300 of FIGS. 3A-3D, dilution hole 220 of FIG. 2, and grommet 400 of FIG. 4, but with varied arrangements of internal cooling features to balance cooling performance with the pressure drop across grommet 500. Internal components in grommet 500 may be formed using additive manufacturing techniques in a manner similar to grommet 400. Grommet 500 may include downstream region 504 and upstream region 506 similar to downstream region 404 and/or upstream region 406 of FIG. 4. Grommet 500 may also include perimeter region 508 that includes convective cooling passage 510 and internal cooling features 509. Convective cooling passage 510 may be a length of passage lacking pedestals and smaller passages. Convective cooling passage 510 may extend from inner diameter of grommet 500 to outer diameter of grommet 500 in a radial direction. Internal cooling features 509 may begin approximately at the mid-point between upstream region 506 and downstream region 504. Internal cooling features 509 may then extend to outlet passages 511.

In various embodiments, grommet 300 of FIGS. 3A-3D, dilution hole 220 of FIG. 2, grommet 400 of FIG. 4, and grommet 500 of FIG. 5 (referred to collectively as "dilution holes of the present disclosure") are illustrated and described for exemplary purposes. Features of the dilution holes of the present disclosure may be used in any combination with one another in various embodiments comprising similar features. Dilution holes of the present disclosure may increase thermal performance at lower flow levels and thus enable redistribution of cooling to other locations of combustor panels for improved durability and combustor performance. Diffusion holes of the present disclosure may also improve combustor module durability to extend engine-component life. Additive manufacturing technology may also enable generation of diffusion holes and liners to directly produce finished combustor panels with the convective and effusion cooling formed integrally within.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, here a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A grommet having an annular geometry defining a dilution hole, comprising:
   a set of upstream features comprising a first inlet leading into a first plurality of passages with the first plurality of passages each having a first outlet directed towards an inner diameter of the grommet, and
   a set of perimeter features comprising a second inlet leading into a convective cooling passage having a plurality of internal cooling features, wherein the convective cooling passage leads into a second plurality of passages each having a second outlet directed in a circumferential direction of the grommet, and
   a set of downstream features comprising a third inlet leading to a third plurality of passages each having a third outlet directed towards an outer diameter of the grommet.

2. The grommet of claim 1, wherein at least one of a pedestal in the first plurality of passages or the third outlets of the third plurality of passages are aligned with a build direction of an additive manufacturing technique.

3. The grommet of claim 2, wherein the internal cooling features of the convective cooling passage comprise a pedestal aligned with a build direction of an additive manufacturing process.

4. The grommet of claim 1, further comprising a bell-mouth inlet disposed about the inner diameter of the grommet, wherein the bell-mouth inlet comprises at least one of a radial curve or multi-radial curve.

5. The grommet of claim 1, wherein at least one of the first inlet, the second inlet, and the third inlet are bell-mouthed.

6. The grommet of claim 1, wherein the convective cooling passage comprises a segment devoid of pedestals between the second inlet and the second plurality of passages.

7. A combustor liner comprising:
   an array of cooling holes defined by the combustor liner; and
   a plurality of grommets having annular geometry and formed integrally with the combustor liner and defining a plurality of dilution holes, wherein a grommet from the plurality of grommets comprises:
   a first inlet formed in a cold side of the combustor liner and leading into a first plurality of passages with each of the first plurality of passages having a first outlet formed in a hot side of the combustor liner and directed towards an inner diameter of the grommet, and
   a second inlet formed in the cold side of the combustor liner and leading into a convective cooling passage having a plurality of internal cooling features, wherein the convective cooling passage leads into a second plurality of passages each having a second outlet that extends about the inner diameter of the grommet in a circumferential direction and opens to the hot side of the combustor liner, and
   a third inlet formed in the cold side of the combustor liner and leading to a third plurality of passages with each passage from the third plurality of passages having a third outlet formed in the hot side of the combustor liner and directed towards an outer diameter of the grommet.

8. The combustor liner of claim 7, further comprising a bell-mouth inlet disposed about the inner diameter of the grommet, wherein the bell-mouth inlet comprises at least one of a radial curve or multi-radial curve.

9. The combustor liner of claim 7, wherein at least one of the first inlet, the second inlet, and the third inlet are bell-mouthed.

10. The combustor liner of claim 7, wherein the internal cooling features of the convective cooling passage comprise a pedestal aligned with a build direction of an additive manufacturing process.

11. A gas turbine engine comprising:
    a compressor section configured to compress a gas;
    a combustor section aft of the compressor section and configured to combust the gas, wherein the combustor section comprises a liner having a plurality of grommets formed integrally with the liner and defining a plurality of dilution holes, wherein each grommet from the plurality of grommets comprises:
    a first inlet formed in a cold side of the liner and leading into a first plurality of passages, wherein each of the first plurality of passages has a first outlet formed in a hot side of the liner and directed towards an inner diameter of the grommet, and
    a second inlet formed in the cold side of the liner and leading into a convective cooling passage having a plurality of pedestals formed in the convective cooling passage, wherein the convective cooling passage leads into a second plurality of passages disposed about the inner diameter of the grommet in a circumferential direction, wherein the second plurality of passages opens to a second plurality of outlets, and
    a third inlet formed in the cold side of the liner and leading to a third plurality of passages with each passage from the third plurality of passages comprises a third outlet formed in the hot side of the liner, wherein each third outlet of the third plurality of passages is directed towards an outer diameter of the grommet; and
    a turbine section aft of the combustor section and configured to extract energy from the gas.

12. The gas turbine engine of claim 11, further comprising a bell-mouth inlet disposed about the inner diameter of each grommet, wherein the bell-mouth inlet comprises at least one of a radial curve or multi-radial curve.

13. The gas turbine engine of claim 11, wherein for each grommet at least one of the first inlet, the second inlet, and the third inlet are bell-mouthed.

14. The gas turbine engine of claim 11, wherein for each grommet the convective cooling passage comprises a segment devoid of pedestals between the second inlet and the second plurality of passages.

* * * * *